Aug. 5, 1969        H. OBERTHÜR        3,459,000
DUAL-NETWORK HYDRAULIC SYSTEM AND VALVE ARRANGEMENT
FOR CONTROLLING SAME

Filed July 11, 1967        2 Sheets-Sheet 1

Heinrich Oberthür
*INVENTOR.*

BY *Karl J. Ross*
Attorney

United States Patent Office 3,459,000
Patented Aug. 5, 1969

3,459,000
DUAL-NETWORK HYDRAULIC SYSTEM AND VALVE ARRANGEMENT FOR CONTROLLING SAME
Heinrich Oberthür, Offenbach-Rumpenheim, Germany, assignor to Alfred Teves Maschinen- und Armaturenfabrik KG, Frankfurt am Main, Germany, a corporation of Germany
Filed July 11, 1967, Ser. No. 652,475
Claims priority, application Germany, July 5, 1966, T 31,521
Int. Cl. F15b 7/00, 3/00
U.S. Cl. 60—54.5        10 Claims

ABSTRACT OF THE DISCLOSURE

Hydraulic brake installation comprising a pair of fluid networks each having a master cylinder, a respective wheel-brake cylinder and conduits interconnecting the master and wheel cylinders; and a pressure-equalizing valve interconnecting said networks and provided with a mechanism responsive to concurrent actuation of both master cylinders for equalizing the fluid pressure in the networks but maintaining fluid separation therebetween, and effective when only one master cylinder is actuated to pressurize only the respective brake network.

---

My present invention relates to dual-network hydraulic installations of the type in which a pair of hydraulic sensors respond to an input and transmit fluid pressure to respective fluid-responsive motors designed to respond to the input and perform work in accordance therewith; more particularly, this invention relates to dual-network hydraulic brakes for automotive vehicles which are to be functionally interconnected but hydraulically separated.

Dual-network or dual-circuit hydraulic installations are used for various purposes including machine control, as servo-response systems and the like. They are also common in so-called dual-brake systems for automotive vehicles as will become apparent hereinafter. A dual-network or dual-circuit hydraulic installation, according to this invention, is one which has at least two hydraulic input devices, e.g. hydraulic (piston) pumps or fluid-control devices adapted to generate or otherwise serve as pressure sources, which are connected with respective hydraulic output devices (e.g. hydraulic piston-and-cylinder motors) by conduits through which the fluid passes. Frequently, it is desirable to couple the fluid-responsive output devices or motors with one another for joint operation and yet maintain the hydraulic networks separate from one another so that, upon failure by leakage or the like of one system, the other remains operative, or such that individual operation is permitted when joint functioning is cut off. In motor vehicles, it frequently is desirable to increase the safety of a hydraulic brake system by providing, for example, tandem master cylinders, each pressurizing a respective set of transmission lines and actuating corresponding sets of wheel-brake cylinders. In such systems too, it is desirable to prevent hydraulic interconnection of the systems which, although jointly operated, are individually actuatable upon failure of one or the other network. In such systems, the mechanical interconnection of the brakes is not a problem since the tandem cylinders prevent independent operation of both hydraulic systems in the absence of failure.

In certain vehicles, however, namely agricultural, constructional and road-building machinery such as wheeled tractors, haymaking and baling machinery, front-end loaders and the like, the wheels may be individually braked to permit tight turns and greater facility of controlling the position and movement of the vehicle. In these systems, a pair of brake pedals is provided with the individual brake pedals actuating respective master cylinders or control valves communicating with the respective wheel-brake cylinders. For road travel and many working purposes, it is desirable to interconnect the pedals for joint operation and, in general, it has been the practice to mechanically link the pedals by a pivotal coupling member to effect joint operation. Because of nonuniform wear of the brake linings, the stroke of each brake pedal may yield a characteristic brake response differing from the response of the other brake in such arrangements and arrangements in which a control member is provided at the driver's post for coupling and decoupling the brake system.

It has been found that arrangements of this latter type are disadvantageous because of the need for individual action of the brakes when turning right or left, since the right-hand brake permits a right turn while the left-hand brake permits a left turn; the provision of levers and complex force-transmission mechanisms, camming arrangements and the like for rendering the efficiency of the brake systems uniform is not only expensive but introduces complications in the repair and maintenance of the brake systems. These disadvantages hold true for other hydraulic installations in which independent operation of the hydraulic motors is desired in some cases but joint operation is needed in others.

It is, therefore, the principal object of the present invention to provide a dual-network hydraulic system in which a pair of hydraulic motors is actuated by respective hydraulic inputs for individual operation and can be hydraulically coupled without hydraulic communication between the systems for joint operation.

A further object of this invention is to provide an improved dual-brake system having respective master cylinders communicating with respective sets of wheel cylinders and which permits joint operation of the brakes and individual operation thereof selectively.

Still another object of my invention is to provide a brake system of the character described, especially for the individual braking of the wheels or tracks of agricultural and building tractors, construction machines, agricultural implements or the like for facilitating the turning of the vehicle whereby disadvantages of earlier dual-brake systems can be avoided.

A more specific object of this invention is to provide a control valve for a dual-network hydraulic system adapted to be used for brake installations and the like.

I have now found that the disadvantages of prior-art systems can be avoided substantially completely when, in an installation such as a dual-brake system for automotive vehicles having a pair of brake pedals individually actuable to control the wheel brakes on opposite sides of the vehicle, which comprises hydraulic input devices (such as brake master cylinders operated by the brake pedals), respective hydraulic output devices, e.g. wheel-brake cylinders connected hydraulically to the master cylinders, and a pressure-equalization valve functionally connecting the two hydraulic networks while blocking fluid communication therebetween; the valve contains mechanism operable when *both* master cylinders are actuated to equalize the pressure in the networks and compensate for individual brake deficiencies, and operable when *only one* master cylinder is actuated to block force transmission between the networks and transmit full braking force to the respective wheel cylinder.

According to an important aspect of this invention, the valve comprises a valve body having a pair of cylinder bores each communicating with the respective wheel-brake cylinder or output device and receiving a piston adapted to urge hydraulic fluid through the respective output port, but pressurized by a respective input device or actuating cylinder. Between each piston and the respective inlet port from the master cylinder of the other brake network, I provide a check valve which is held open by the respective force-transmitting piston and, in turn, controls the fluid flow from the inlet to the respective outlet port.

According to a more specific feature of this invention, the equalization and force-transmission valve comprises a pair of parallel cylinder bores closed at one end and open in opposite directions at their other ends, and a pair of channels interconnecting these bores on opposite sides of respective force-transmission pistons. Each check valve is disposed between a respective inlet port and a cylinder bore into which the check valve is threaded, the check valve forming simultaneously the connecting fitting for the inlet port. The passage between this inlet port in one of the cylinder bores and communicating with one working chamber thereof, extends through one of these channels to the corresponding outlet port via the second working chamber of the other cylinder bore. At least one of the cylinder bores is provided with a venting valve or bleeder for draining air or gas from the system.

The above and other objects, features and advantages of the present invention will become more readily apparent from the following description, reference being made to the accompanying drawing in which.

Figure 1:
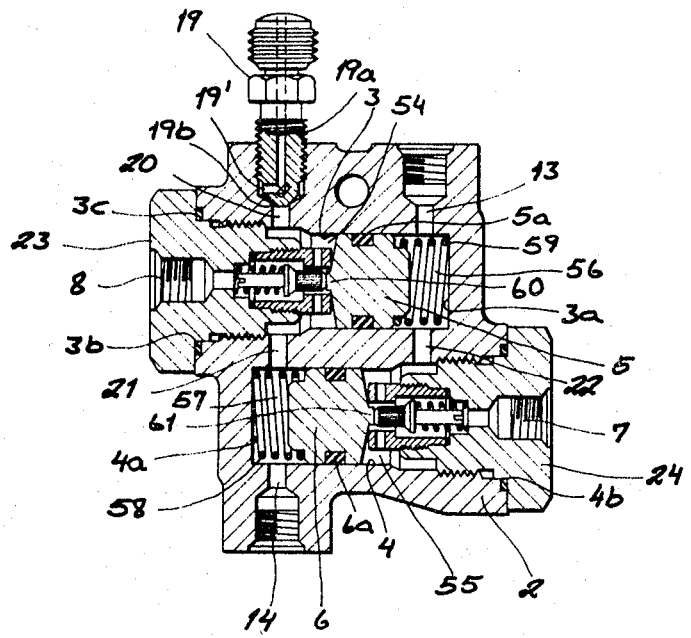
FIG. 1 is an axial cross-sectional view through a valve according to the present invention.
Figure 3:
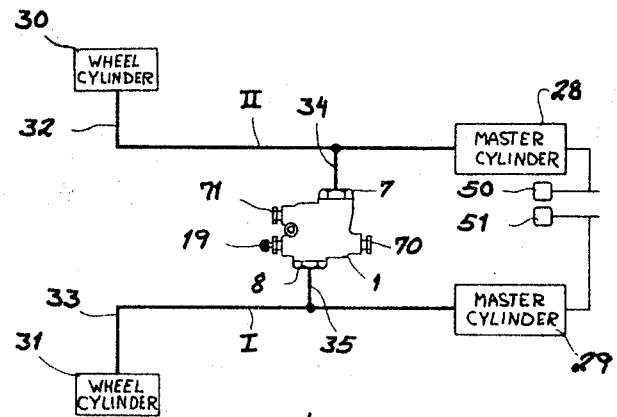
FIGS. 3–5 are diagrammatic illustrations of brake installations using the valve of FIG 1.
Figure 4:
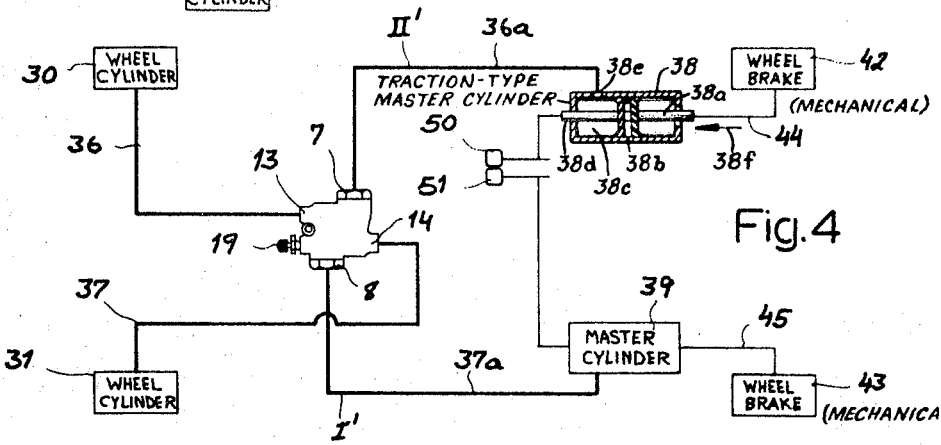
Figure 5:
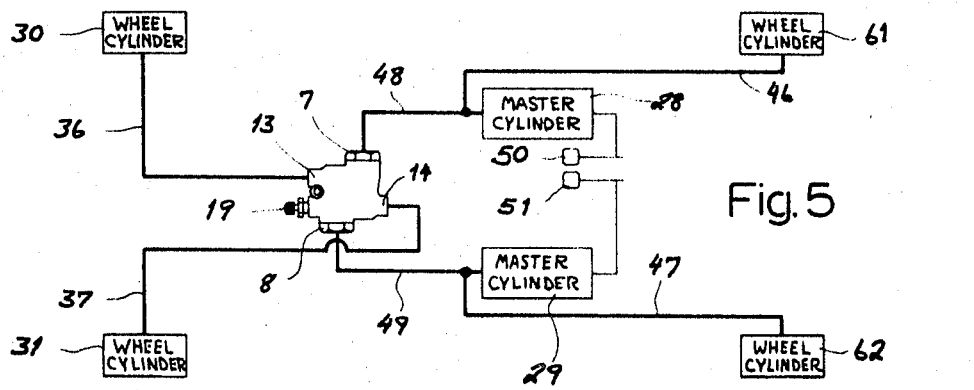

Referring first to FIG. 1, it can be seen that the force-transmitting and equalizing valve 1 of the present invention comprises a valve housing 2 having a pair of mutually parallel, transversely spaced and generally symmetrical cylinder bores 3 and 4 which are closed at the respective extremities 3a and 4a and open outwardly at 3b, 4b. Each of these cylinders is subdivided by a pair of freely sliding force-transmitting pistons 5 and 6, whose peripheral seals 5a and 6a engage the walls of the bores 3 and 4, into respective pairs of working chambers 54, 56 and 55, 57. Into the "first" working chambers 54 and 55 of the bores 3 and 4, there are threaded respective fittings 23 and 24 which provide the inlet ports 7 and 8 of the respective inlet means. The ports 7 and 8 are respectively connected to the hydraulic input devices, i.e. the master cylinders of a dual brake system as illustrated in FIGS. 3–5 for respective actuation of wheel brake cylinders 30 and 31 via respective outlet ports 13 and 14 connected in the respective hydraulic networks. A vent valve 19 is threaded into a bleeder port 20 and has a throughgoing bore terminating at 19' to drain gases from the connected chambers 54 and 57 when the threaded portion 19a of the bleeder valve is backed out of its bore to withdraw the conical valve portion 19b from its seat.

Figure 2:
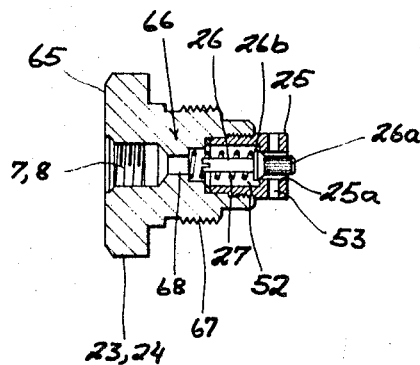
FIG. 2 is an axial cross-sectional view of the check valve of FIG. 1.

As is apparent from FIG. 2, each of the fittings 23 and 24 comprises a nutlike head 65 adapted to sealingly engage a washer 3c when the valve body 66 is tightened in the housing 2. The valve body is provided with a threaded shank 67 adapted to engage the respective cylinder bore as illustrated in FIG. 1, and forming a tube which is open inwardly with respect to its cylinder bore. The check-valve seat is formed by a sleeve 25 which is threaded into the body 66 coaxially with the inlet port 7 or 8 and a connecting bore 68 leading therefrom. The sleeve 25 forms a cage for the check-valve member 26 whose milled extension 26a is received with clearance in the center bore 25a of sleeve 25. Behind this extension 26a, there is provided a conical closure member 26b which, in the absence of reverse pressure, is designed to engage the edge 25b of the bore 25a which thus forms a seat for the valve member. A coil spring 27 is seated against the body 66 and the shoulder formed by closure member 26b to urge the valve member 26 to the right into valve-closing relationship. Normally, however, the axial protuberance 60 or 61 upon the respective piston 5 or 6 retains the check-valve member 26 in its open condition to permit fluid flow from the inlet port 7 or 8 into the chamber 54 and 55, respectively.

Within the "second" working chamber 56 and 57, at which the outlet ports 13 and 14 communicate with the cylinder bores 3 and 4, I provide respective compression springs 59 and 58 which urge the pistons 5 and 6 to the left and right, respectively, against the valve members of the respective check valve.

As can be seen from FIGS. 3–5, the valve structure of FIGS. 1 and 2 can be utilized in various brake arrangements. In FIG. 3, for example, I show a brake system for an agricultural tractor whose brake pedals 50 and 51 respectively act upon master cylinders 28 and 29 hereinafter considered as part of the brake networks II and I respectively. In this embodiment, the network I comprises a duct 33 connecting the first master cylinder 39 directly with the wheel cylinder 31 of the brake at the right-hand side of the vehicle while a conduit 35 ties the ductwork 33 to the inlet port 38 of the valve 1. Similarly, the left-hand master cylinder 28, which is actuated by pedal 50, is hydraulically connected via line 32 to the wheel-brake cylinder 30 which is, in turn, connected at duct 34 to the inlet port 7 of valve 1. In normal braking operation with this embodiment, the vehicle driver can depress either pedal 50 or pedal 51 and thereby generate pressure in the line 32 or 33 to operate the respective wheel brakes via the cylinders 30 and 31. The vehicle direction can thus be controlled in a conventional manner. As illustrated in FIGS. 1 and 2, however, the actuation of either or both brake pedals causes hydraulic fluid to enter the inlets 7 and 8 via their respective check valves and the chambers 52 formed in the check-valve sleeves 25 thereof.

If the check valves are assumed to be in their unblocked condition, it will be seen that the hydraulic fluid continues past the closure member 26b and proceeds outwardly from the chamber 52 through a pair of radial bores which communicate with the central bore 28 and remain effective even when the protuberances 60 and 61 of the pistons 5 and 6 project into the check valves. Hydraulic fluid is thus delivered to the first working chambers 54 and 55 of the cylinder bores 3 and 4 and, because outlets 13 and 14 are blocked by plugs 70 and 71 (FIG. 3), the pressure within the second working chambers 57 and 56, respectively, of the other cylinder bores is equal to that within the first chambers 54 and 55. Connecting channels 21 and 22 interconnect the first working chamber 54 of one cylinder bore 3 with the second working chamber 57 of the other cylinder bore 4. Similarly, channel 22 connects working chamber 55 with chamber 56. If the brakes are pressurized equally and are equally effective, the pistons 5 and 6 do no more than act as membranes for pressure equalization on both sides while maintaining the networks I and II in force-transmitting mechanical communication and barring exchange of fluid therebetween. However, when both brakes are actuated, as soon as the pressure in one of the "first" working chambers 54 or 55, for example chamber 54, exceeds that of the other chamber 55 (as may result from a nonuniform actuation of the master cylinders 28 and 29 or nonuniform wear of the brake linings or efficiency of the brake stroke), piston 5 (to which network I is connected at inlet 8) shifts to the right against the force of spring 59. A portion of the hydraulic fluid in chamber 56 is thus forced through the channel 22 into the working chamber 55 of the other bore until the pressure is equalized between the two networks. In extreme cases of pressure differential across one or the other of the pistons 5, 6, the piston experiencing the differential is shifted against its compression spring 58 or 59 until the seats in its bore and its protuberance 60 or 61 is lifted from the valve body 26 of the respective check valve. The check valve is thus blocked to prevent drain of power from the network which remains effective and to effectuate direct force transmission between the master cylinder and the wheel brake cylinders of the operative brake network.

In the modification of FIG. 4, the rear-wheel brakes 42 and 43 are connected directly to the piston of the respective master cylinder 38 or 39 which are here operated by the brake pedals 50 and 51. The master cylinders 38 and 39 are operated by tension from the pedals. In this embodiment, the master cylinder 38 of hydraulic network II' is connected to the inlet port 7 via a line 36a, while the outlet port 13 communicates with the wheel-brake cylinder 30 by way of hydraulic line 36. The other inlet port 8 is pressurized from the master cylinder 39 via line 37a and the outlet 14 is connected by line 37 to wheel cylinder 31.

In general, the installation of FIG. 4 functions in the manner previously described, it being noted that simultaneous pressurization of the pedals 50 and 51, concurrent movement of the brakeshoes and corresponding brake wear upon both shoes will result in the application of equal pressures on both sides of each of the pistons 5 and 6. Accordingly, the pedal 51 will displace hydraulic fluid from the master cylinder 39 through the line 37a into the inlet port 8 and thence through the check valve 23 into the working chamber 54; from this chamber a hydraulic fluid flows through the channel 21 into the working chamber 57 of the bore 4 and thence through outlet port 14 to line 37 and the corresponding wheel-brake cylinder 31. Similarly, hydraulic fluid flow from master cylinder 38 enters inlet port 7 and passes to check valve 24 while proceeding through working chamber 55, channel 22, chamber 56 and outlet portion 13 to the wheel cylinder 30. Should the hydraulic flow be such that line 37a experiences a higher pressure than line 36a, the flow into chamber 54 will bias the piston 5 to the right, thereby increasing the displacement of fluid in chamber 56 and augmenting any movement of brake pedal 50 in displacing hydraulic fluid through the outlet port 13. Again, the pressure in lines 36 and 37 is equalized. Should the wheel cylinder 30 be excessively inefficient, the hydraulic flow urging piston 5 to the right will force fluid as well out through port 7 into the tension-acting master cylinder 38 to operate the brake 42 as well as the brake 30.

In the modification of FIG. 5, the brake pedal 50 and 51 displace the pistons of the master cylinders 38 and 39 directly to force hydraulic fluid into lines 48 and 49 which communicate with the inlet and outlet ports 7 and 8, respectively. The rear-wheel brakes 61 and 62 are connected in parallel to the inlets 7 and 8 and are actuated as described in connection with the embodiment illustrated in FIG. 3. On the other hand, the front wheel brakes 30 and 31 are supplied with hydraulic fluid from outlet ports 13 and 14 as described in connection with FIG. 4. When it is desired to turn the vehicle by use of the wheel brakes, only the master cylinder associated with the brake on the side of the vehicle opposite the direction of turn need be actuated to clamp the respective brake while the other wheel continues to rotate. Hydraulic fluid in this case flows from one of the inlets 7 or 8 while the other line is depressurized. The corresponding piston 5 or 6 moves rapidly away from the respective check valve to close the latter while further pressurization delivers hydraulic fluid from line 48 to the line 46 and the corresponding rear-wheel brake 61.

The chambers 54, 55, 56 and 57 are so dimensioned that even in cases of extreme yielding at the wheel cylinders, an equalization is effected.

The invention described and illustrated is believed to admit of many modifications within the ability of persons skilled in the art, all such modifications being considered within the spirit and scope of the appended claims.

I claim:

1. A fluid-pressure-responsive installation comprising a pair of fluid networks each having a fluid-pressure-generating input device, a respective output device and conduit means interconnecting the input and output devices of each network; and a pressure-equalizing valve interconnecting said networks, said valve being provided with mechanism responsive to actuation of both of said input devices for equalizing the fluid pressure in said networks but maintaining fluid separation therebetween, and for permitting individual actuation of said output devices upon exclusive operation of the respective input device, said mechanism including respective check valves biased in communication-blocking direction between each input device and its output device and respective fluid-pressure-controlled pistons each individual to said networks and engageable with the check valve of the other network for controlling same.

2. The installation defined in claim 1 wherein each of said networks is a brake network for an automotive vehicle, said input devices are master cylinders and said output devices are respective wheel-brake cylinders of the vehicle.

3. A fluid-pressure-responsive installation comprising a pair of brake-fluid networks for an automotive vehicle each having a fluid-pressure-generating input device in the form of a master cylinder, a respective output device in the form of a wheel-brake cylinder, and conduit means interconnecting the input and output devices of each network, and a pressure-equalizing valve interconnecting said networks, said valve being provided with mechanism responsive to actuation of both of said input devices for equalizing the fluid pressure in said networks but maintaining fluid separation therebetween, and for permitting individual actuation of said output devices upon exclusive operation of the respective input device, said mechanism being responsive to exclusive actuation of one of said master cylinders to prevent pressure equalization between said networks upon such exclusive actuation, said valve comprising a valve body formed with a pair of cylinder bores, respective force-transmitting pistons axially shiftable in the respective bores for subdividing each of said bores into respective first and second working chambers, said body being provided with channels interconnecting the first working chamber of one of said bores with the second working chamber of the other of said bores and interconnecting the first working chamber of said other bores with the other working chamber of said one bore, said body further being provided with respective inlet means communicating with each of said first chambers and the conduit means of the respective network, whereby concurrent and nonuniform actuation of said master cylinders applies a pressure differential across at least one of said pistons for transmitting force to the low-pressure fluid to equalize the fluid pressure in said networks.

4. The installation defined in claim 3 wherein each of said inlet means includes a respective check valve for restricting flow of fluid into the corresponding first chamber upon the application of an excessive fluid pressure differential across the respective piston.

5. The installation as defined in claim 4 wherein said master cylinder and said wheel-brake cylinder of the respective network are connected in parallel to the respective bore at the respective inlet means.

6. The installation as defined in claim 4 wherein said master cylinder is reversely pressurizable by said pressure-equalizing valve and is a traction-type master cylinder coupled with a mechanical brake.

7. The installation as defined in claim 4 wherein said valve body is provided with outlet means communicating between each of the second working chambers and the wheel-brake cylinder of the other network.

8. The installation as defined in claim 4 wherein said check valves each have a valve member engageable with the respective piston and normally retainable thereby in a valve-unblocking condition.

9. The installation as defined in claim 8 wherein said pressure-equalizing valve is provided with a pair of compression springs each received in the respective bore and bearing upon the respective piston to urge same into valve-unblocking engagement with the respective check-valve member.

10. The installation defined in claim 9 wherein said cylinder bores are transversely spaced and mutually parallel while being closed at corresponding extremities and open at faces of said valve body, said check valves being mounted in respective screw fittings threaded axially into the respective bores, said pressure-equalizing valve further comprising a venting valve communicating with at least one of said chambers.

References Cited

UNITED STATES PATENTS

| | | |
|---|---|---|
| 2,395,811 | 3/1946 | Griffith. |
| 3,064,434 | 11/1962 | Parrett. |
| 3,345,112 | 10/1967 | Kershner. |
| 3,376,078 | 4/1968 | Brace et al. _____ 303—6 |

FOREIGN PATENTS

| | | |
|---|---|---|
| 333,365 | 8/1930 | Great Britain. |

MARTIN P. SCHWADRON, Primary Examiner
ROBERT R. BUNEVICH, Assistant Examiner

U.S. Cl. X.R.
188—152